United States Patent [19]

Kiser et al.

[11] Patent Number: 5,289,696
[45] Date of Patent: Mar. 1, 1994

[54] MODULAR EVAPORATIVE HUMIDIFICATION DEVICE

[75] Inventors: Thomas E. Kiser, Fremont; Norman R. Mowery, II, Tiffin; Thomas J. Yallstrom, Fremont, all of Ohio

[73] Assignee: Professional Supply, Inc., Fremont, Ohio

[21] Appl. No.: 972,572

[22] Filed: Nov. 6, 1992

[51] Int. Cl.⁵ .............................................. F28D 5/00
[52] U.S. Cl. ......................................... 62/305; 62/314; 62/259.4; 261/DIG. 15
[58] Field of Search ............... 62/304, 305, 314, 121, 62/297, 298, 257.4; 261/140.1, DIG. 3, DIG. 15, DIG. 41, DIG. 43; 454/337

[56] References Cited

U.S. PATENT DOCUMENTS

| Re. 32,461 | 7/1987 | Di Peri | 62/314 |
| 1,016,336 | 2/1912 | Kuhns | 62/298 |
| 2,310,121 | 2/1943 | Scherer | 62/314 |
| 2,636,371 | 4/1953 | Stephens | 62/314 |
| 3,171,401 | 3/1965 | McDuffee | 261/DIG. 15 |
| 3,799,513 | 3/1974 | Winton | 261/39 |
| 4,828,171 | 5/1989 | Akin et al. | 237/19 |

FOREIGN PATENT DOCUMENTS 2835115 2/1980 Fed. Rep. of Germany ........ 62/298

Primary Examiner—Henry A. Bennett
Assistant Examiner—William C. Doerrler
Attorney, Agent, or Firm—Marshall & Melhorn

[57] ABSTRACT

An evaporative humidification unit of modular construction readily adapted for assembly in selected configurations is provided. The configuration or array required for a particular installation is determined, and a supporting framework for the configuration is assembled from a selection of standardized structural components. The framework defines an array of compartments for basket or container units containing discrete, randomly-oriented flow-diffusing packing elements. The front and rear faces and floor of the basket units are mesh covered whereby air may be drawn transversely through the mass of diffusing elements while water is flowing downwardly therethrough. Spray units are positioned above the baskets for spraying water onto the mass of diffusing elements, and a collection pan is located beneath each basket for collecting and carrying away water which flows downwardly through the mass.

13 Claims, 3 Drawing Sheets

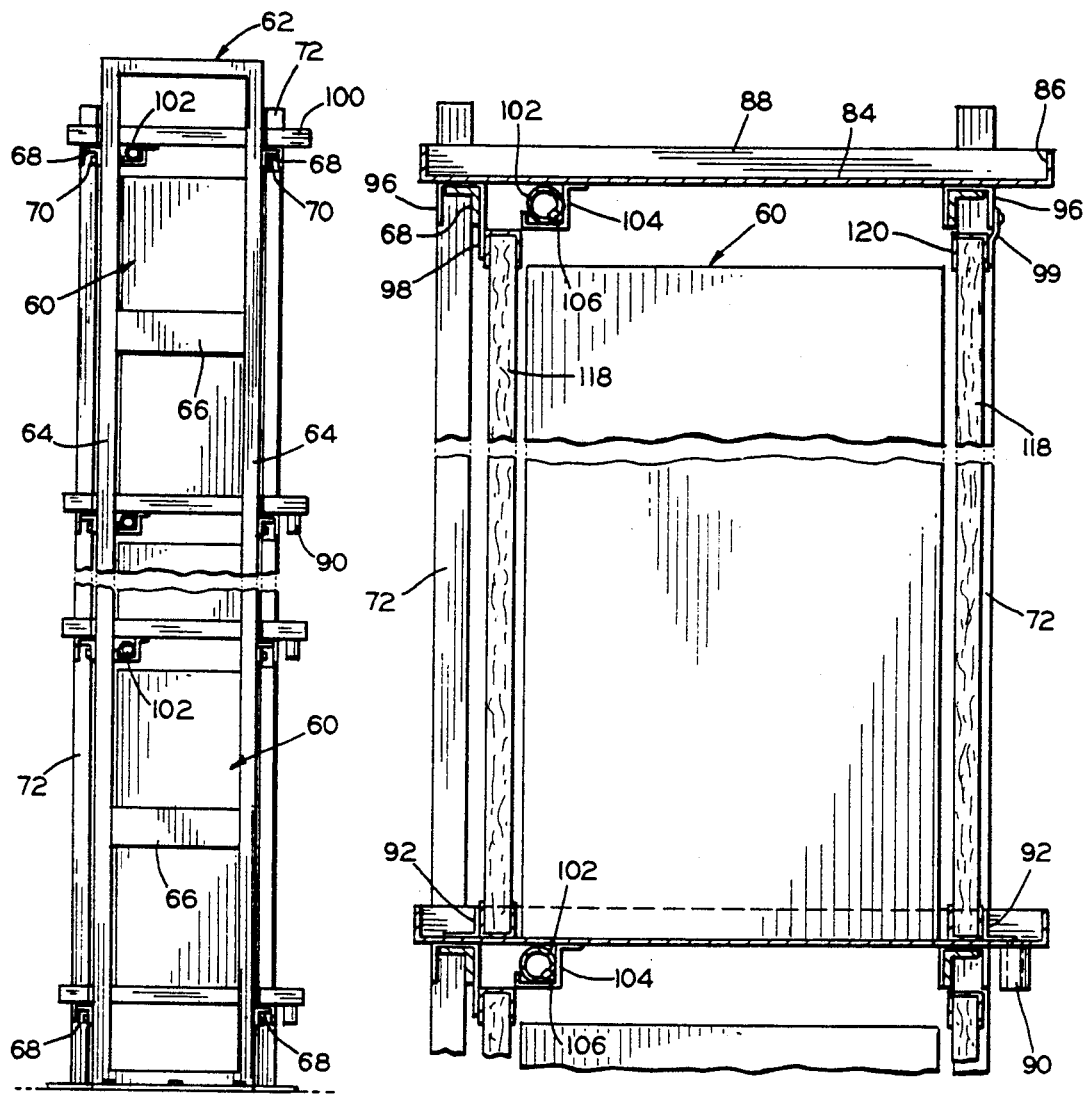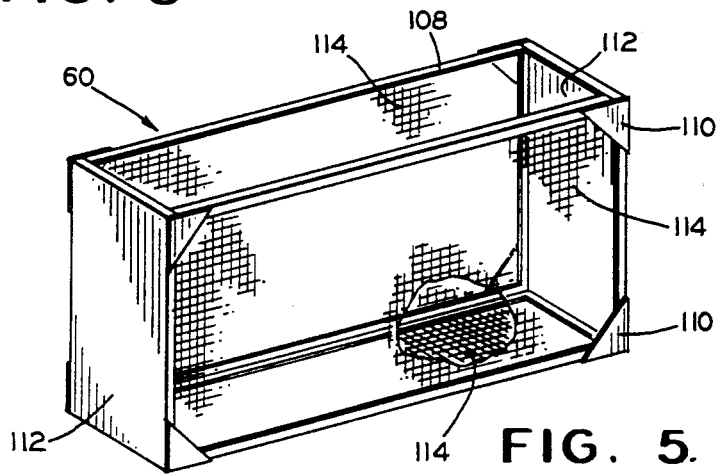

MODULAR EVAPORATIVE HUMIDIFICATION DEVICE

BACKGROUND OF THE INVENTION

1. Field of the Invention

The present invention pertains generally to a device for humidifying a stream of air, and more particularly to a modular evaporative humidification structure for use with units supplying conditioned air to the interior of enclosed structures.

2. Description of the Prior Art

Present day industrial-type buildings are conventionally supplied with conditioned air for maintaining desired atmospheric conditions within the building by means of so-called airhouses or air handling units disposed about or within the building. In such airhouses fresh air from the outside and/or return air from the building interior are drawn into the airhouse in selected proportions, conditioned as by heating, cooling, humidifying, filtering, purifying, dehumidifying etc. as appropriate, and then admitted to the building to maintain desired atmospheric conditions therewithin. Systems of the type with which the invention has particular utility are disclosed and fully described, for example, in U.S. Pat. Nos. 4,850,264, 4,960,041, and 5,146,977, as well as copending U.S. patent application Ser. No. 07/665,352, filed Mar. 6, 1991, all of which are incorporated herein by reference.

The buildings with which such air handling units are employed vary widely in size and design, and may range from a few thousand square feet to one million square feet or more in area. As a result, the airhouses employed may also vary in design, number and size. In many instances it may also be desirable to retrofit existing airhouses to incorporate state-of-the-art systems as disclosed in the aforementioned patents and patent application, for increased energy efficiency and compliance with pollution and health standards. Where it is desired to provide humidification in the air handling system, due to the differences in size and construction of the airhouses it has heretofore generally been necessary to custom design and build an evaporation unit for each airhouse. This procedure is both costly and time-consuming, and may result in undue delay in completion of a project.

SUMMARY OF THE INVENTION

There is provided in accordance with the invention an evaporative humidification device of modular construction, wherein individual modules can be assembled in selected combinations using standardized components to create units suitable for installation in airhouses of different dimensions and configurations. Baskets or containers of suitable standard dimensions are formed of frame members covered on at least their front and rear walls and bases or floor with wire mesh. An upstanding framework is assembled from frame members provided in various standard configurations to accommodate an array of the baskets whereby the assembled unit will have the dimensions required for the particular airhouse. The assembled units may incorporate baskets positioned side-by-side and stacked one above another in tiers as required to create the appropriate evaporator section profile. The baskets are filled with discrete, randomly oriented flow diffusing elements such as those known in the trade by the names FLEXIRING ® packing and Paul rings. A drain pan is carried within the framework beneath each tier of baskets. The baskets rest upon the drain pans, and a spray wand extends along and beneath the drain pan and/or a cover above each tier of baskets for spraying water onto the diffusing elements within the baskets therebelow. The water flows downwardly over the diffusing elements as air is drawn laterally through the baskets by the adjacent airhouse fan unit, and water which reaches the bottom of the baskets is collected in the pans and drained off. Air filters may be positioned adjacent either or both vertical faces of the baskets.

BRIEF DESCRIPTION OF THE DRAWINGS

In the drawings, wherein like numerals refer to like parts throughout:

FIG. 3 is a broken, end elevational view of the evaporative humidification section shown in FIG. 1;

FIG. 4 is an enlarged partial end view, taken substantially along line 4—4 of FIG. 1;

FIG. 5 is a perspective view of a typical basket or container for flow diffusing elements in accordance with the invention;

DESCRIPTION OF THE PREFERRED EMBODIMENT

Figure 1:
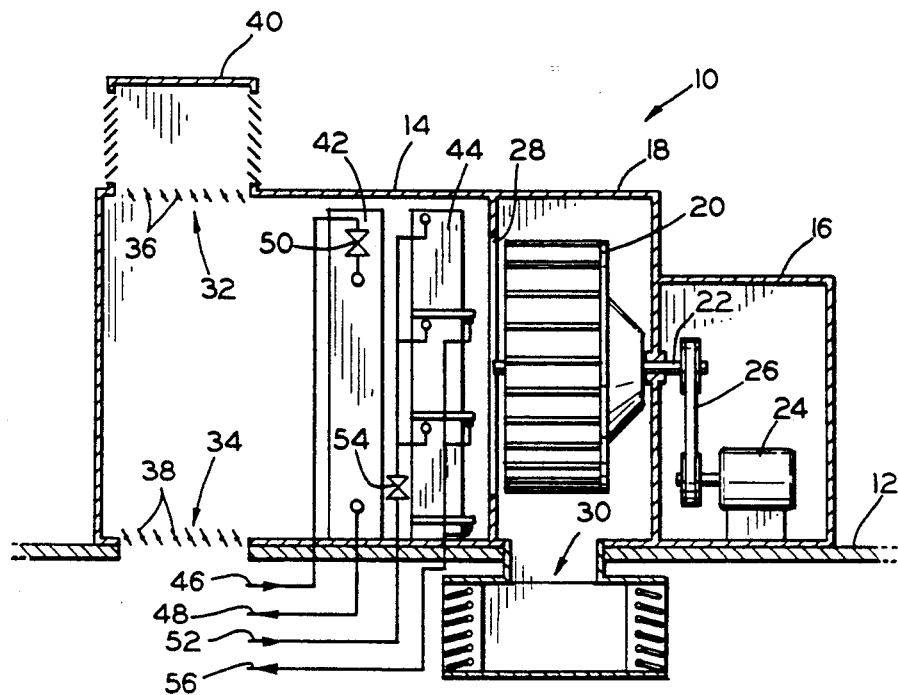
FIG. 1 is a vertical section through a typical airhouse embodying the invention.

With reference now to the drawings, and particularly to FIG. 1, there is shown generally at 10 an airhouse of a type which may advantageously incorporate the evaporative humidification device of the invention. Such airhouses are conventionally located as on the roof 12 of industrial buildings such as factories, warehouses and the like (not shown) as described in the aforementioned patents. Such airhouses are adapted to not only admit air to the interior of the building so as to maintain desired pressurization within the building, but may also regulate the temperature and relative humidity of the building atmosphere.

The airhouse thus more particularly comprises a box-like housing 14 of generally rectangular configuration mounted on the roof 12 and having at one end a drive motor cabinet 16. The housing includes a fan chamber section 18 within which an impeller 20 is operably mounted and journelled for rotation on a shaft 22. The impeller shaft is drivingly coupled to a motor 24 as by a belt 26. The fan chamber section 18 includes an open end 28 through which air is drawn from the cabinet 14 by the impeller wheel and discharged through an outlet 30 in the fan shroud and roof 12 into the building.

The impeller 20 of the airhouse is generally driven at a constant velocity, and atmospheric conditions within the building are maintained at desired levels by admitting a modulated combination of outside air and building return air through the airhouse. Thus, there is provided on the inlet side of the housing 14 an outside air inlet 32 and a building return air inlet 34. The inlets 32 and 34 are provided with adjustable dampers 36 and 38, respectively. The dampers are interconnected so as to operate in opposition and are provided with a suitable actuating mechanism (not shown) operably controlled by a central computer. A hood 40 is provided over the inlet 32 for preventing rain and snow from entering the housing 14.

In order to heat the incoming air and add moisture at such times as may be necessary, there is provided within the airhouse a heating means and a suitable humidifying means. Where the building atmosphere does not include combustible or explosive materials, the heating means may advantageously be a conventional gas direct-fired space heater unit well known in the trade. However, where processes employed within the building involve materials which may be combustible or explosive when dispersed in the atmosphere, such direct-fired or exposed-flame heaters are not suitable. In such situations the airhouse may be provided with a hot water heat exchanger 42 and an evaporative humidification unit 44 positioned in tandem in the flow path of the air through the airhouse. The heat exchanger is of conventional construction and is connected by means of inlet and return lines 46 and 48, respectively, to a suitably controlled source (not shown) of heated liquid. A flow control valve 50 provided at the inlet to the heat exchanger is operably connected as to a central computer (not shown) whereby flow of heated liquid through the exchanger is regulated in response to observed temperature conditions within the associated building area.

While the evaporative humidification unit 44 has been illustrated in FIG. 1 as being employed in combination with a liquid medium heat exchanger, it will be appreciated that it may as well be utilized in an airhouse employing other and different heating units such as direct fired gas or oil burning units, or even in installations not requiring or utilizing heating units. In any event, the humidification unit 44 is connected by means of a supply line 52 to a suitable source of water. A flow control valve 54 is provided in the supply line for regulating the flow of water to the evaporative humidification unit. The water supplied to the unit may conventionally be heated to enhance evaporation, and the flow control valve 54 may advantageously be operably controlled by the central computer for regulating flow of water, and hence evaporation, in response to observed relative humidity conditions within the associated building area. A drain line 56 is provided for carrying away effluent from the unit.

Figure 2:
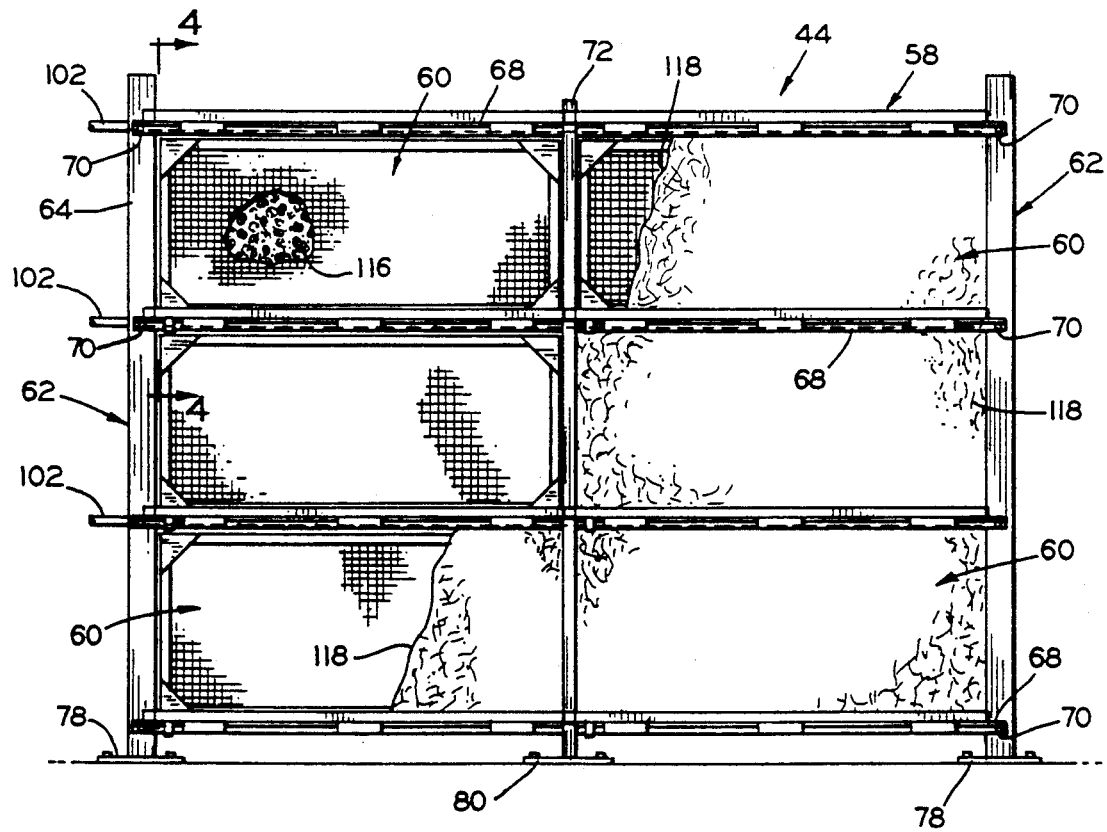
FIG. 2 is a front elevational view of an evaporative humidification section such as employed in FIG. 1.

As will be seen in FIG. 1, the evaporative humidification unit 44 is preferably of such dimensions as to extend substantially from side to side and from floor to roof across the airhouse. It is thus necessary for air being drawn into the fan shroud section 18 to pass through the unit 44 with the maximum area being presented to the incoming air for reception of evaporating liquid. To that end the evaporative humidification unit 44 as best seen in FIG. 2, includes a framework identified generally at 58, assembled from selected standardized components to receive the required number of individual containers 60 arranged so as to be accommodated within the housing 14. The containers 60 are of such dimensions that they may be positioned side-by-side and one above another in multiples within the framework to create a unit of appropriate dimensions. Filler panels may then be employed to close any gaps which exist between the perimeter of the assembled unit 44 and the adjacent walls of the housing 14.

The framework 58 includes end stanchions 62 comprised of upright posts 64 interconnected by cross braces 66 and of an appropriate height for accommodating the desired number of tiers of containers 60. Spaced horizontal support members 68 are affixed to the stanchions 62 as by bolts 70. The horizontal members 68 may be provided in a number of lengths to permit ready assembly of a framework 58 accommodating the desired number of columns or stacks of containers 60. The particular configuration of the framework will, or course, be dictated by the dimensions of the airhouse within which it is to be installed. By way of example, the framework may accommodate a single container 60, or it may be assembled to accommodate three or more containers side-by-side and/or one above another as required. The framework may advantageously be formed of conventional structural angle stock. Intermediate vertical support members 72 interconnect the horizontal members 68 between adjacent ends of the containers.

Figure 6:
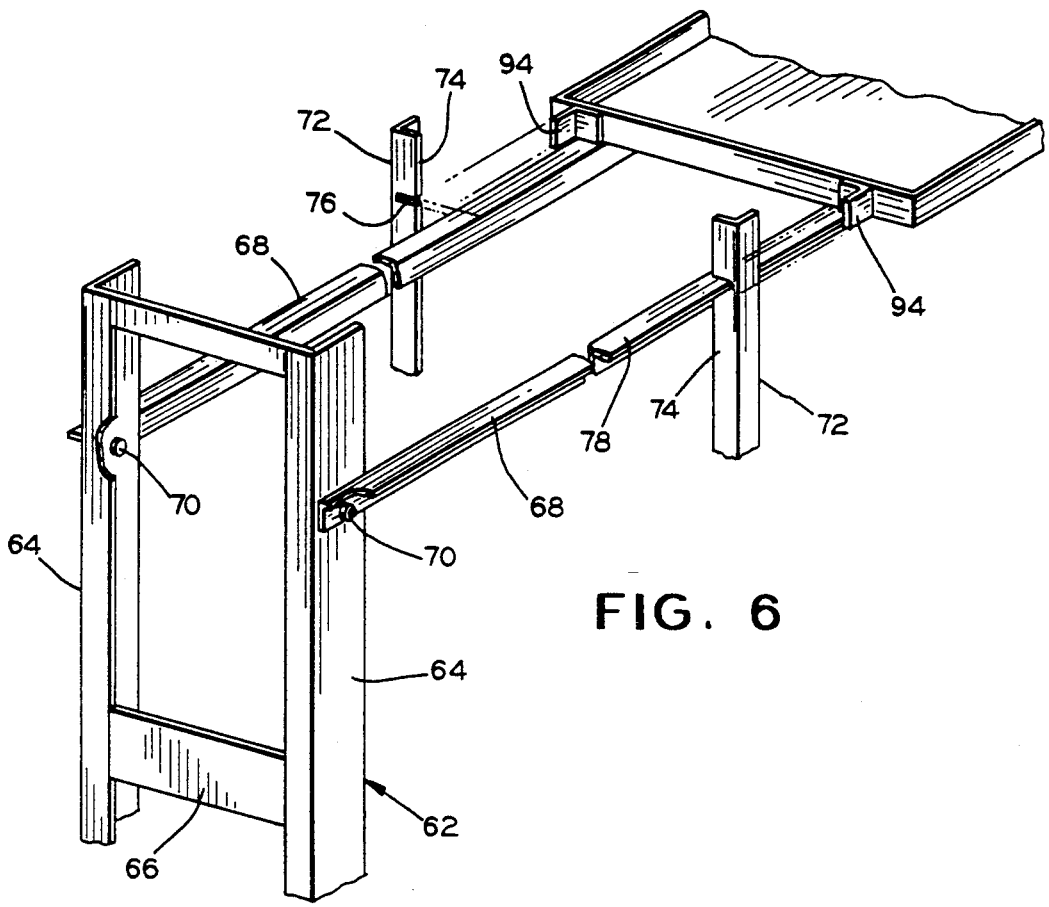
FIG. 6 is a fragmentary, partially exploded, perspective view of a portion of the frame of the invention.

As best seen in FIG. 6, the horizontal and vertical support members 68 and 72, respectively, are structural angle shapes, with an inwardly directed leg 74 of the member 72 having a recess or slot 76 within which an outwardly directed leg 78 of the member 68 is received for supporting the horizontal member intermediate its ends. The posts 64 and vertical supports 72 have base plates 78 and 80, respectively, at lower ends which may be secured to the floor of the housing 14 as by bolts or by welding.

Figure 7:
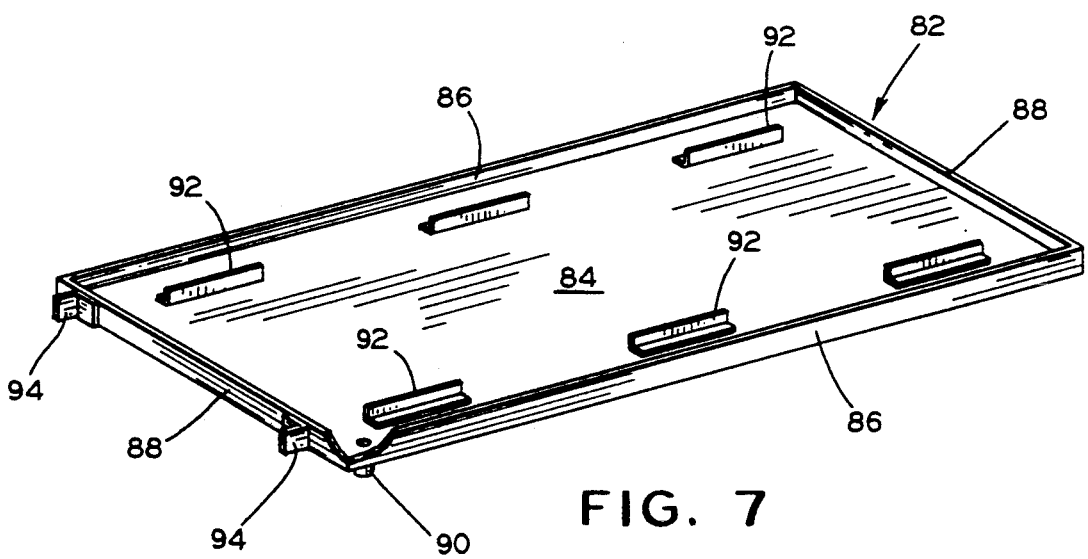
FIG. 7 is a perspective view, with a portion broken away, of a drain pan employed in the invention.

The framework thus defines a spatial or modular area for receiving each of the containers 60 comprising the unit 44. The framework 58 and the containers 60 are dimensioned so that the containers can be inserted in and removed from the assembled framework to facilitate assembly of the units and subsequent periodic maintenance. A collection pan, shown generally at 82, is installed within the framework 58 for supporting each of the containers 60 and collecting and draining off water which descends through the container without evaporating. As best seen in FIGS. 6 and 7, the collection pans include a bottom or floor plate 84 surrounded by upstanding side and end walls 86 and 88, respectively. A drain outlet 90 is provided adjacent one corner of the floor plate. Angle members having upstanding legs 92 are suitably affixed to the floor plate 84 for positioning and retaining the containers 60 and associated air filters as will be hereinafter described.

Angle brackets affixed to one of the end walls 88 have outwardly projecting legs 94 adapted to extend over the associated vertical support member 72 with the collection pan in its assembled position to retain the vertical support member in engagement with the horizontal support member 68. Also, as will be seen in FIGS. 3 and 4, retainers such as spaced, longitudinally extending, inverted channel sections 96 are affixed to the underside of the floor plate 84 so as to fit over the horizontal support members 68 along either side and restrain them from bowing inwardly or outwardly. The channel section 96 on the upstream side of the unit 44 may advantageously include an interior flange 98 which extends downwardly a sufficient distance to serve as a retainer for an air filter as will be described. A spring loaded clip 99 may be affixed to the exterior flange of the channel section 96 on the downstream side of the unit to likewise serve as a retainer for an air filter. Cover members 100, which are generally similar to the collecting pan 82 but without the drains 90 and angle members with legs 92, are provided over the top tier of the containers 60.

Water is sprayed onto the discrete liquid dispersing elements within the containers 60 by means of a spray line 102 extending longitudinally beneath the appropriate collecting pans 82 or cover member 100 as the case may be. The spray lines are carried within clips 104 affixed to the undersides of the collection pans 82 and cover 100 and extend throughout the length of the assembled unit 44. The spray lines 100, suitably connected to the line 52 and the flow control valve 54 for receiving a supply of water under pressure, are provided with nozzle outlets 106 appropriately positioned therealong for spraying water onto the dispersing elements within the containers 60.

As best seen in FIG. 5, the containers 60 in a preferred embodiment comprise a framework 108 in the form of a rectangular parallelepiped fabricated as of structural angle members. The corners of the framework along the front and rear faces may be provided with stiffening gussets 110, and the opposite ends are enclosed by cover plates 112. The bottom and the front and rear faces of the framework 108 are covered by sheets 114 of open mesh screening as of stainless steel. The screening is of such mesh size as to retain the discrete elements to be placed within the container or basket, while permitting free flow of air across the container and allowing water flowing downwardly through the container to be deposited in the collection pan therebeneath.

As heretofore indicated, the containers 60 are filled with randomly oriented discrete flow-diffusing packing elements as shown generally at 116 in FIG. 2. The elements 116 are preferably of such configuration as to cause the water sprayed onto the top of the mass of elements by the spray line 102 to disperse as it flows downwardly through the mass and present a large exposed surface area to the air flowing therethrough to facilitate evaporation. The elements must not retain pockets or pools of stagnant water during non-operating periods. Such stagnant water in air handling systems is potentially a source of serious health problems for people exposed to the conditioned air discharged by the air handling system. In order to preclude such stagnant water, the elements 116 may be in the form of open end cylindrical shapes of the type well-known in the heat exchange art by the names Paul rings or FLEX-IRING ®. Paul rings are illustrated and described in the context of a different use, for example, in U.S. Pat. No. 4,275,708.

There is positioned adjacent either or both the upstream and downstream faces of the containers 60 when installed within the framework 58 a filter element 118 such as a conventional aluminum mesh filter. Such filters generally include a surrounding frame member 120 as will be seen in FIG. 4. As illustrated in FIGS. 1 and 4, the filters are of such dimensions as to cover the associated screen covered faces of the container 60 so that air drawn through the evaporative humidification unit 44 also passes through the filters. The filters should be readily replaceable and to that end the container 60 and the filters are sized so that with the container in place upon the collection pan 82, the frames 120 of the opposite filters 118 will be readily received within gaps between the container and the upstanding retaining legs 92. The frame member 120 along the top of the upstream filter is disposed behind the extension 98 of the inverted channel 96. Thus, for insertion or removal the filter 118 can merely be raised upwardly behind the extension 98 to engage or disengage the lower edge behind the leg 92. The filter on the downstream side is similarly installed by springing the clip 99 outwardly to clear the upper edge of the filter.

Briefly reviewing the invention, a framework 58 is assembled from a selection of standard end stanchions 62, horizontal support members 68 and intermediate vertical supports 72 of appropriate dimensions for the particular airhouse installation 10. Collection pans 82 are installed within the framework as appropriate for supporting each tier of containers, and a cover member 100 is provided above the top tier of containers. Spray lines 102 are installed in the clips 104 and connected to the supply line 52. The containers or baskets 60 are filled to a suitable level with randomly oriented elements 116, and the containers are placed within the framework 58 upon the collection pans 82 and between the upstanding legs or flanges 92. The drain outlets 90 of the collecting pans are suitably connected to the drain line 56. The filters 118 are installed opposite the upstream and/or downstream faces of the containers 60. Flashing plates (not shown) may be conventionally installed to cover gaps between adjacent containers 60 and the framework 58, and between the framework and the walls of the housing 14 where appropriate to prevent incoming air from flowing around or between the containers. As will be readily apparent, there is thus provided an evaporative humidification unit which can be readily adapted and assembled for installation in newly constructed airhouses, as well as for retrofitting of existing airhouses of various dimensions. Maintenance is simplified in that both the air filters 118 and the liquid dispersing elements 116 can be readily removed and replaced as necessary with a minimum interruption in operation.

It is to be understood that the forms of the invention herewith shown and described is to be taken as illustrative embodiments only of the same, and that various changes in the shape, size and arrangement of parts may be resorted to without departing from the spirit of the invention.

We claim:

1. A modular evaporative humidification unit for airhouses, comprising a structural framework defining at least one compartment adapted to receive and support a container, said framework comprising a spaced pair of end stanchions and spaced pairs of transversely aligned longitudinally extending support members interconnecting said end stanchions and defining with said end stanchions said at least one compartment, said container having perforate front and rear walls and floor, a mass of randomly oriented liquid flow dispersing units within said container, spray means disposed above said container for depositing a liquid onto said mass of flow dispersing units, and means beneath said container for collecting and carrying away liquid flowing downwardly through and out of said container, said means beneath said container comprising a collection pan supported upon said framework, said collection pan including a floor plate surrounded by upstanding side and end walls, a drain outlet in said floor plate, and retainer means on the bottom of said floor plate for engaging a said pair of longitudinally extending support members, whereby air drawn laterally through said mass absorbs evaporated liquid.

2. A modular evaporative humidification unit for airhouses, comprising a structural framework defining at least one compartment adapted to receive and support a container, said framework comprising a spaced pair of end stanchions, and spaced pairs of transversely aligned longitudinally extending support members interconnecting said end stanchions and defining with said end stanchions said at least one compartment, including a pair of spaced, transversely aligned intermediate vertical support members positioned between said spaced pair of end stanchions, each said vertical support member interconnecting at least two of said longitudinally extending support members, said container having perforate front and rear walls and floor, a mass of randomly oriented liquid flow dispersing units within said container, spray means disposed above said container for depositing a liquid onto said mass of flow dispersing units, and means beneath said container for collecting and carrying away liquid flowing downwardly through and out of said container, said means beneath said container comprising a collection pan supported upon said framework, said collection pan including a floor plate surrounded by upstanding side and end rolls, a drain outlet in said floor plate, one of said end walls having a pair of legs projecting outwardly therefrom adapted to extend over and retain said intermediate vertical support members in engagement with said longitudinally extending support members, whereby air drawn laterally through said mass absorbs evaporated liquid.

3. A modular evaporative humidification unit for airhouses, comprising a structural framework defining at least one compartment adapted to receive and support a container, said container having perforate front and rear walls and floor, a mass of randomly orientated liquid flow dispersing units within said container, spray means disposed above said container for depositing a liquid onto said mass of flow dispersing units, and means beneath said container for collecting and carrying away liquid flowing downwardly through and out of said container, said means beneath said container comprising a collection pan supported upon said framework, said collection pan including a floor plate surrounded by upstanding side and end walls, and positioning means including upwardly directed legs affixed to said floor plate for positioning said container upon said floor plate, said container being supported upon said collection pan, whereby air drawn laterally through said mass absorbs evaporated liquid.

4. A modular evaporative humidification unit for airhouses, comprising a structural framework defining at least one compartment adapted to receive and support a container, said container having perforate front and rear walls and floor, a mass of randomly orientated liquid flow dispersing units within said container, spray means disposed above said container for depositing a liquid onto said mass of flow dispersing units, and means beneath said container for collecting and carrying away liquid flowing downwardly through and out of said container, said means beneath said container comprising a collection pan supported upon said framework, said collection pan including a floor plate surrounded by upstanding side and end walls, and clips carried beneath said floor plate for suspending a spray line including said spray means, said container being supported upon said collection pan, whereby air drawn laterally through said mass absorbs evaporated liquid.

5. A modular evaporative humidification unit for airhouses, comprising a structural framework defining at least one compartment adapted to receive and support a container, said container having perforate front and rear walls and floor, a mass of discrete, randomly oriented liquid flow dispersing units within said container, spray means disposed above said container for depositing a liquid onto said mass of discrete flow dispersing units, and means beneath said container for collecting and carrying away liquid flowing downwardly through and out of said container, said means beneath said container comprising a collection pan supported upon said framework, said container sitting in and being supported on said collection pan, whereby air drawn laterally through said mass absorbs evaporated liquid.

6. A modular evaporative humidification unit for airhouses as claimed in claim 5, wherein said structural framework defines a plurality of said compartments adjacent one another, each compartment receiving a said container so as to define a predetermined array of said containers adapted for a said airhouse.

7. A modular evaporative humidification unit for airhouses as claimed in claim 5, wherein said framework comprises a spaced pair of end stanchions, and spaced pairs of transversely aligned longitudinally extending support members interconnecting said end stanchions and defining with said end stanchions said at least one compartment.

8. A modular evaporative humidification unit for airhouses as claimed in claim 7, including a pair of spaced, transversely aligned intermediate vertical support members positioned between said spaced pair of end stanchions, each said vertical support member interconnecting at least two of said longitudinally extending support members.

9. A modular evaporative humidification unit for airhouses as claimed in claim 5, wherein said liquid flow dispersing units comprise open end cylindrical elements free from liquid retaining pockets when randomly oriented within said container.

10. A modular evaporative humidification unit for airhouses as claimed in claim 7, including at least three said pairs of transversely aligned longitudinally extending support members defining at least two tiers of said compartments.

11. A modular evaporative humidification unit for airhouses as claimed in claim 8, including at least two said pairs of intermediate vertical support members positioned between said end stanchions to define at least three said compartments side-by-side.

12. A modular evaporative humidification unit for airhouses as claimed in claim 1, wherein said retainer means comprises inverted channel sections extending along each longitudinal side edge of said collection pan for fitting over and resting upon said longitudinally extending support members.

13. A modular evaporative humidification unit for airhouses as claimed in claim 3, including an air filter unit disposed adjacent at least one of the front and rear walls of said container, the lower longitudinal marginal edge of said filter unit being received between said container and said positioning means, and including means for engaging the upper longitudinal margin of said filter unit for maintaining said filter unit upright along the associated wall.

* * * * *

UNITED STATES PATENT AND TRADEMARK OFFICE
CERTIFICATE OF CORRECTION

PATENT NO.  : 5,289,696
DATED       : March 1, 1994
INVENTOR(S) : Kiser et al.

It is certified that error appears in the above-identified patent and that said Letters Patent is hereby corrected as shown below:

TITLE PAGE

[75] Inventors, line 3, "Yallstrom" should be ---Yellstrom---.

Signed and Sealed this

Fifth Day of July, 1994

Attest:

BRUCE LEHMAN

Attesting Officer      Commissioner of Patents and Trademarks